Dec. 25, 1951                J. C. PEKAR ET AL                2,580,317
                                    PURGER
                            Filed Feb. 25, 1950

INVENTORS
JOSEPH C. PEKAR AND
BY JAMES P. HIRD

Oberlin + Limbach
ATTORNEYS.

Patented Dec. 25, 1951

2,580,317

UNITED STATES PATENT OFFICE 2,580,317

PURGER

Joseph C. Pekar, Bedford, and James P. Hird, Lakewood, Ohio, assignors to Kep-Dri Corporation, Cleveland, Ohio, a corporation of Ohio Application February 25, 1950, Serial No. 146,348

3 Claims. (Cl. 183—80)

The present invention relates generally as indicated to a purger and more particularly to a purger adapted to cleanse or purify fluids, especially vapors and gases, by separating therefrom impurities, heterogeneous, or superfluous matter.

As an example of one of the many uses to which the device constituting this invention may be put is the removal of moisture, oil, rust, and other suspended particles from steam and for such use this device may well be classed as a steam separator or purifier. Another typical use of this device is to effect separation of dust particles from air or other gases, in which case the device may be appropriately referred to as a dust collector. In any event the term "purger" is considered generic to devices of the character indicated regardless of the specific fluid which is adapted to be flowed therethrough and to be cleansed or purified during the course of such flow.

Heretofore it has been proposed to provide entrainment separators in which vapors enter a hollow, enlarged casing tangentially to set up a circular or rotary motion of the vapors whereby droplets and other suspended particles are thrown against an inner slitted wall of the device, such particles passing through the slits to an annular chamber surrounding such inner wall and thus passing out of the path of the vapors. In this type of separator, the suspended particles collect in the annular chamber and drop down to a bottom discharge and the cleaned vapors leave at the center of the top of the casing. Another similar expedient well known in the art is to provide a device in which the dust-laden vapor or gas again enters an enlarged chamber tangentially thereof, the velocity of the vapor thus being reduced to an extent such that the dust-carrying capacity of the vapor is reduced whereby the dust particles drop out, the cleaned gas being exhausted from the center of the device as far as possible from the deposited or falling dust.

Still other devices heretofore used employ series of baffles or vanes which cause abrupt changes in the direction of flow of the vapor or gas and thus in the case of steam for example the entrained water is thrown out by its momentum against the baffles and conducted therefrom into a receiver.

From the foregoing it can be seen that the purgers now known in the art depend either upon centrifugal force for effecting desired separation of suspended particles from vapors or gases or upon baffles or vanes to cause abrupt changes in the direction of flow of the vapors or gases.

Accordingly, it is one object of this invention to provide a purger which, without any moving parts therein, imparts a rotating or whirling motion to the fluid to be cleansed and which is provided in addition with baffles for effecting abrupt changes in the direction of flow of the fluid, whereby to achieve higher efficiency than obtainable with known devices.

Another object of this invention is to provide a purger which effects cleansing of fluids by the combined action of centrifugal force and scrubbing action both of which are produced by a simple diffuser unit contained within the device.

Another object of this invention is to provide a purger which has therein a vortex stabilizer to preclude the drawing of the suspended particles toward the cavity or vacuum which is created at the center of the whirling mass of fluid.

Another object of this invention is to provide a purger in which the mass of fluid passing into an expansion chamber in the purger casing is caused to travel in a generally helical path imparting radial and axial velocity components to the fluid whereby the suspended particles are directed toward the wall of an expansion chamber and pass axially into an annular chamber which surrounds the central outlet passage of the purger casing.

Another object of this invention is to provide a purger in which the vortex stabilizer aforesaid comprises a bank of axially extending apertures located at a point spaced axially from the inner end of the outlet passage.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 1:
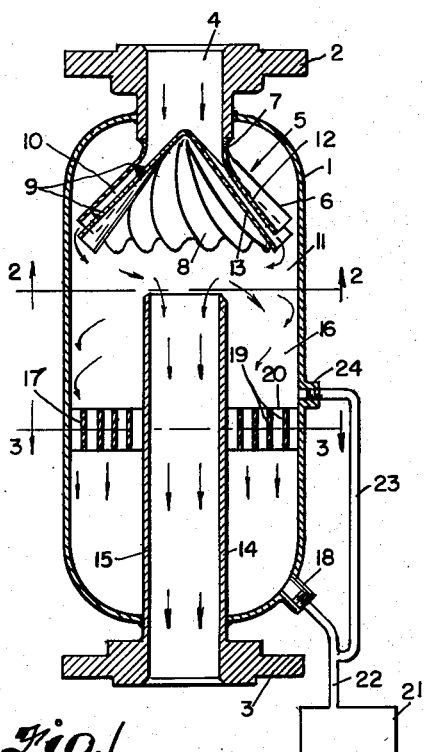
Fig. 1 is a longitudinal cross-section view of one form of the device constituting the present invention, the plane of the section being represented by the curved line 1—1, Fig. 2.

Referring now more particularly to the drawing, the purger illustrated therein comprises a casing 1 of generally cylindrical form having flanges 2 and 3 or the like welded or otherwise secured at opposite ends, said flanges constituting the means by which the casing may be connected into a pipe line through which a vapor or gas flows. It is to be understood that threaded ports may be provided at opposite ends of said casing instead of the flanges illustrated. As a matter of convenience, purgers intended for installation in pipe lines ranging from ½" to 2" pipe size will ordinarily be provided with internally threaded ports whereas purgers intended for installation in larger pipe lines ranging from 2½" upward in pipe size for example will be provided with flanges 2 and 3 as shown. It is to be understood that the particular type of connection of the casing to a pipe line whether threaded, flanged, or other form, is a matter of indifference and does not constitute any part of this invention.

Figure 2:
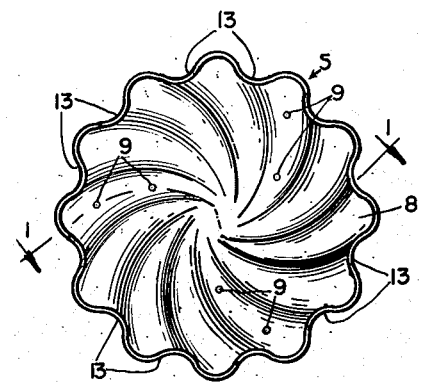
Fig. 2 is a transverse cross-section view of the device on a somewhat enlarged scale taken substantially along the line 2—2, Fig. 1 to clearly show the diffuser in bottom plan view.
Figure 3:
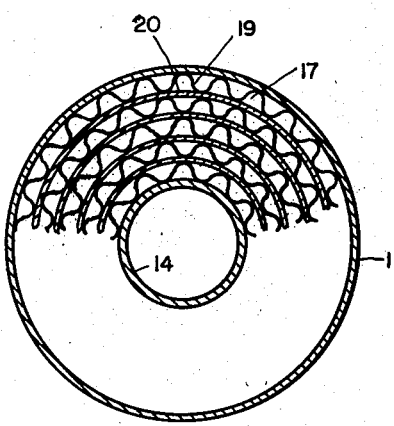
Fig. 3 is a transverse cross-section view on a somewhat enlarged scale through the vortex stabilizer in the device, such section having been taken along the plane indicated by the line 3—3, Fig. 1.

Leading into said casing 1 from one end thereof is an inlet passage 4 and secured within said casing at the inner end of such passage is a diffuser 5 which is herein illustrated as comprising a frusto-conical element 6 having a cylindrical terminus 7 welded or otherwise secured to said casing 1 and a conical element 8 secured to said conical element 6, as, for example, by means of protuberances 9 at circumferentially spaced intervals on one element welded to the other element. Said conical elements 6 and 8 are thus secured in axially spaced relation whereby to define a downwardly and outwardly extending passageway 10 communicating the inlet passage 4 with the enlarged expansion chamber 11 defined by the inner wall of said casing. As best shown in Figs. 1 and 2, the diffuser elements 6 and 8 are formed with complementary corrugations 12 and 13 which extend spirally from the vertex toward the outer periphery of the respective elements, said corrugations preferably being of progressively increasing depth and width as shown toward the periphery of said elements. It is preferred that the cross-sectional area at the smallest portion of the corrugated passageway 10 thus formed between said conical elements 6 and 8 be at least as great as that of the inlet passage 4 but preferably on the order of 130% greater than said inlet passage. The elements 6 and 8 may be likened to spiral bevel gears with the corrugations commencing at the vertices running spirally along the conical surfaces of the elements.

It can now be seen that as the vapor or gas flows through the inlet passage 4 and through the passage 10 formed between the spirally corrugated conical elements 6 and 8 there will be imparted to the vapor or gas rotating or whirling motion by reason of the spiral disposition of the corrugations 12 and 13 and at the same time there will be imparted thereto an axial velocity component by reason of the corrugations extending downwardly as well as generally tangentially of the inner wall of the casing. Moreover, some of the vapor or gas will pass over from one corrugation to the next and thereby be subjected to abrupt changes in direction of flow to effect a desired scrubbing action. It can also be seen that said casing 1 is of diameter considerably larger than the inlet passage 4 whereby in the case of steam for example the expansion of the gas in passing from the inlet passage 4 and through the diffuser 5 into the expansion chamber 11 will be cooled by natural refrigeration action to thus condense moisture-carrying solid particles from the steam. In addition, the velocity of the vapor or gas in such expansion chamber 11 will be reduced so that the suspended particles will be separated from the vapor or gas and dropped downwardly along the inner wall of the casing.

Extending upwardly into said casing 1 and centrally within said expansion chamber 11 is a tubular member 14 which forms the outlet passage 15 of the device and through which the cleansed or purified vapor or gas is adapted to flow from the expansion chamber 11. Said tubular member 14 is spaced from the inner wall of the casing so as to define an annular chamber 16 which constitutes the discharge or sediment receiving chamber for the suspended particles which are removed from the gas or vapor by reason of its passing through the diffuser 5 into the expansion chamber 11.

In order to preclude the vortex action of the rotating mass of vapor or gas from drawing the suspended particles toward the center of the mass, there is mounted in said casing 1 and in the discharge chamber 16 spaced from the upper end of said tubular member 14 a vortex stabilizer 17. The function of said stabilizer 17 is to stop the rotation of the mass of fluid whereby the suspended particles will only have an axial velocity component whereby they will pass through the stabilizer into the portion of the annular chamber 16 therebelow and thus carried off through the drain opening 18 formed in said casing 1. Said stabilizer 17 comprises for example an annular perforated ring-like structure which may be formed as by coiling a corrugated metal strip 19 and a flat metal strip 20. Of course, if desired, said stabilizer may be formed as by drilling a plurality of holes axially through an annular ring of thickness such that the axial extent of the holes is several times the diameter of the holes whereby to effectively arrest rotation of the body of fluid.

In the case of a steam purifier, the drain 18 in said casing 1 will be connected to a conventional form of trap 21 and in the line 22 between the drain 18 and the trap 21 is connected a branch line 23 which leads to a vent opening 24 in said casing, said vent 24 being preferably disposed above said stabilizer.

As above indicated, the trap may be of any conventional form such as a float trap which consists of a receiver having a discharge valve controlled by a float, the rise in the water level from the influx of water causing the float to open the valve and thereby allow water to be discharged by the pressure of the steam until the water level is lowered to its normal point. Instead of a float trap, a bucket trap may be employed, the latter trap consisting of a chamber having a bucket therein which is floated by water in the chamber. A valve stem and valve are attached to the bucket and water which enters the trap from the purger finally fills the bucket and causes it to sink and thereby to open the discharge valve. Here again the steam pressure forces the water out through the valve and empties the bucket which consequently rises and closes the valve. The particular form of trap does not of course form any part of the present invention and therefore detail illustration thereof has been deemed unnecessary.

Figure 4:
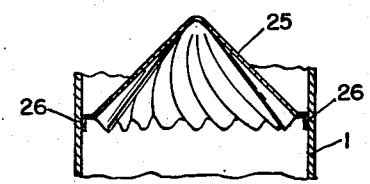
Fig. 4 is a fragmentary cross-section view of the device illustrating a modification in the mounting of one of the diffuser elements.

In the modification illustrated in Fig. 4 the diffuser will preferably comprise an upper conical element (not shown) similar to element 6, and a lower conical and spirally corrugated element 25 similar to element 8. In this form of diffuser the conical element 25 is held in properly spaced relation to the upper element as by lugs 26 welded or otherwise secured directly to said casing.

With the form of purger herein disclosed including a diffuser and vortex stabilizer of the character indicated, separating efficiency in excess of 97% has been effected. The pressure drop through the purger is negligible and it has been found that steam of 99.5% quality and better has been obtained by passing the same through a purger such as herein disclosed.

In essence, the purger herein disclosed comprises a casing which provides an inlet passage, a corrugated spiral passage which imparts axial and tangential velocity components to the gas or vapor, and which effects scrubbing action on the gas or vapor, an expansion chamber into which the gas or vapor is discharged under a generally helical motion, and a centrally disposed outlet passage communicating with the expansion chamber and forming with the casing therearound an annular discharge passage which contains a stabilizer to cancel the tangential velocity component of the vapor or gas whereby to relieve the vortex action.

Although the purger is herein shown in a preferred vertical position with its inlet passage 4 at the top, it will be apparent that it may be installed in a horizontal or angular position if desired.

Other modes of applying the principle of the invention may be employed, change being made as regards the details described, provided the features stated in any of the following claims, or the equivalent of such, be employed.

We therefore particularly point out and distinctly claim as our invention:

1. A purger for fluids comprising a casing formed with a passage therethrough which includes a laterally enlarged portion between its ends, a diffuser at one end of such enlarged portion forming a series of conical helical passages through which fluid is adapted to flow and thus caused to swirl and flow endwise along the side wall of such enlarged portion, a tubular member open at both ends extending endwise into and centrally of the other end of such enlarged portion whereby to define an outlet passage for fluid and to define with such enlarged portion an annular sediment receiving chamber into which suspended particles from the swirling fluid are adapted to pass from such enlarged portion, said diffuser comprising a pair of concentric conical elements secured in spaced relation and formed with matching spiral corrugations defining such conical helical passages therebetween.

2. A purger for fluids comprising a casing formed with a passage therethrough which includes a laterally enlarged portion between its ends, a diffuser at one end of such enlarged portion forming a series of conical helical passages through which fluid is adapted to flow and thus caused to swirl and flow endwise along the side wall of such enlarged portion, a tubular member open at both ends extending endwise into and centrally of the other end of such enlarged portion whereby to define an outlet passage for fluid and to define with such enlarged portion an annular sediment receiving chamber into which suspended particles from the swirling fluid are adapted to pass from such enlarged portion, said diffuser comprising a pair of concentric conical elements secured in spaced relation and formed with matching spiral corrugations defining such conical helical passages therebetween, the corrugations in said conical elements fitting within one another whereby to constitute baffles to effect scrubbing action on the fluid which passes across one passage to the next.

3. A purger for fluids comprising a casing formed with a passage therethrough which includes a laterally enlarged portion between its ends, a diffuser at one end of such enlarged portion forming a series of conical helical passages through which fluid is adapted to flow and thus caused to swirl and flow endwise along the side wall of such enlarged portion, a tubular member open at both ends extending endwise into and centrally of the other end of such enlarged portion whereby to define an outlet passage for fluid and to define with such enlarged portion an annular sediment receiving chamber into which suspended particles from the swirling fluid are adapted to pass from such enlarged portion, said diffuser comprising a pair of concentric conical elements secured in spaced relation and formed with matching spiral corrugations defining such conical helical passages therebetween, and a vortex stabilizer in such sediment receiving chamber operative to arrest rotation of the fluid and thus reduce vortex action tending to draw the suspended particles inward toward such outlet passage, said vortex stabilizer comprising an axially apertured ring-like member across the annular sediment receiving chamber.

JOSEPH C. PEKAR.
JAMES P. HIRD.

REFERENCES CITED

The following references are of record in the file of this patent:

UNITED STATES PATENTS

| Number | Name | Date |
| --- | --- | --- |
| 379,009 | De Rycke | Mar. 6, 1888 |
| 612,207 | Kincaid et al. | Oct. 11, 1898 |
| 706,781 | Reynolds | Aug. 12, 1902 |
| 768,190 | Naylor | Aug. 23, 1904 |
| 1,349,608 | Donaldson | Aug. 17, 1920 |
| 2,102,705 | Henderson et al. | Dec. 21, 1937 |
| 2,106,589 | Bigger et al. | Jan. 25, 1938 |

FOREIGN PATENTS

| Number | Country | Date |
| --- | --- | --- |
| 530,412 | Great Britain | Dec. 11, 1940 |